May 2, 1933. W. F. STREHLOW 1,906,430
AGRICULTURAL IMPLEMENT
Filed Nov. 24, 1930 3 Sheets-Sheet 1
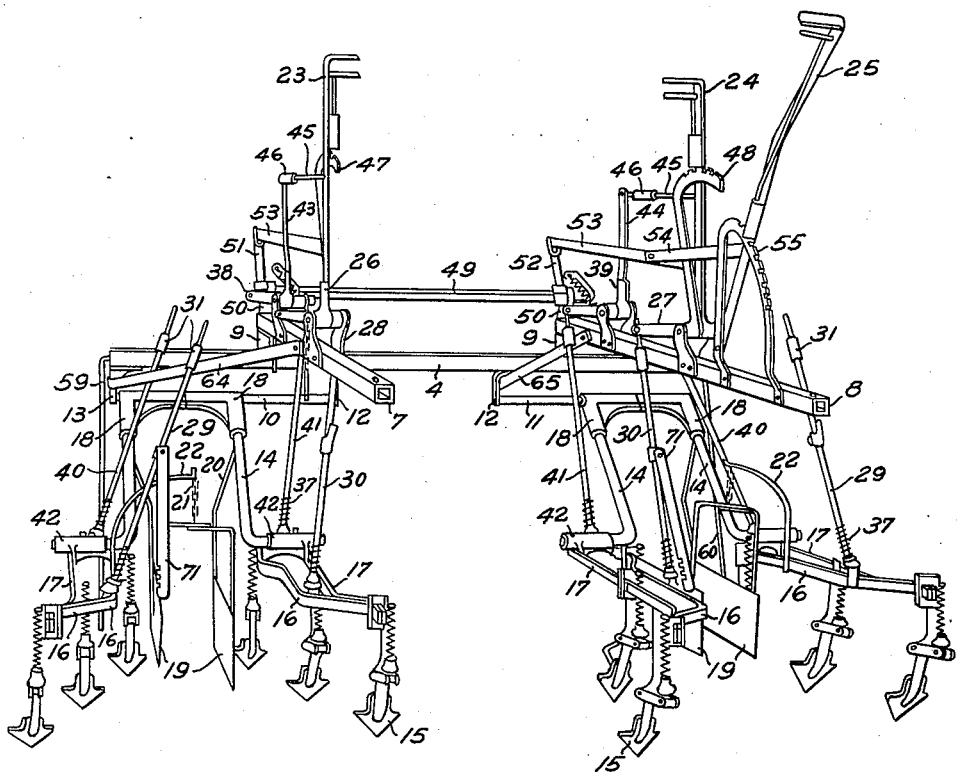
Fig. 1
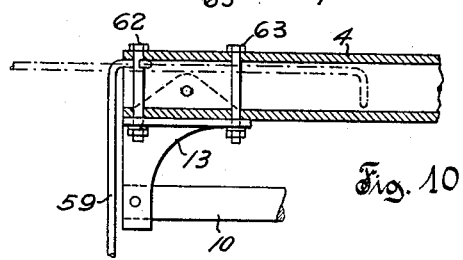
Fig. 11
Fig. 10
Inventor
W. F. Strehlow
by
Attorney May 2, 1933.  W. F. STREHLOW  1,906,430
AGRICULTURAL IMPLEMENT
Filed Nov. 24, 1930   3 Sheets-Sheet 2
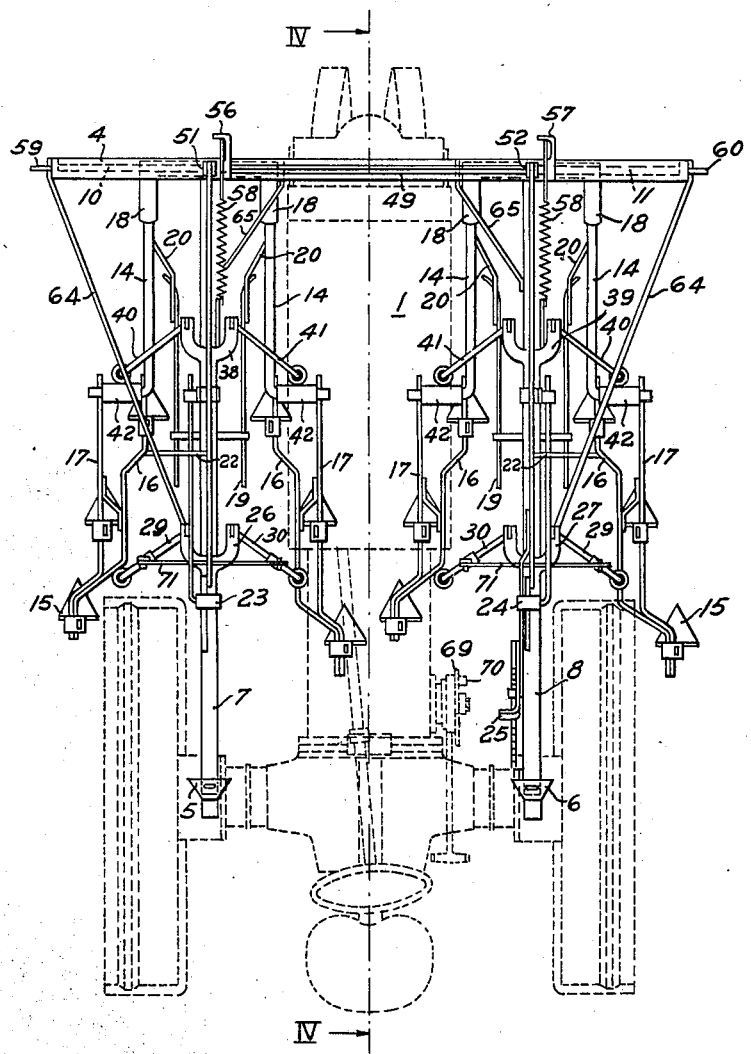

May 2, 1933.   W. F. STREHLOW   1,906,430
AGRICULTURAL IMPLEMENT
Filed Nov. 24, 1930   3 Sheets-Sheet 3
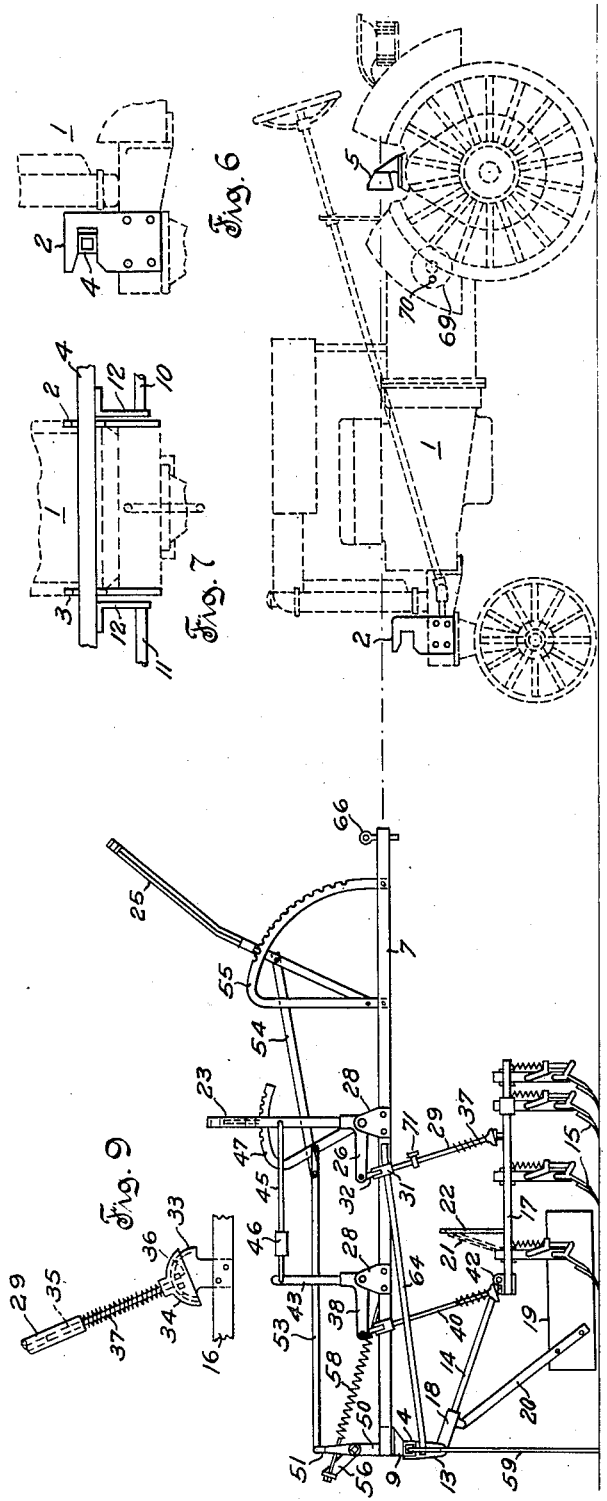
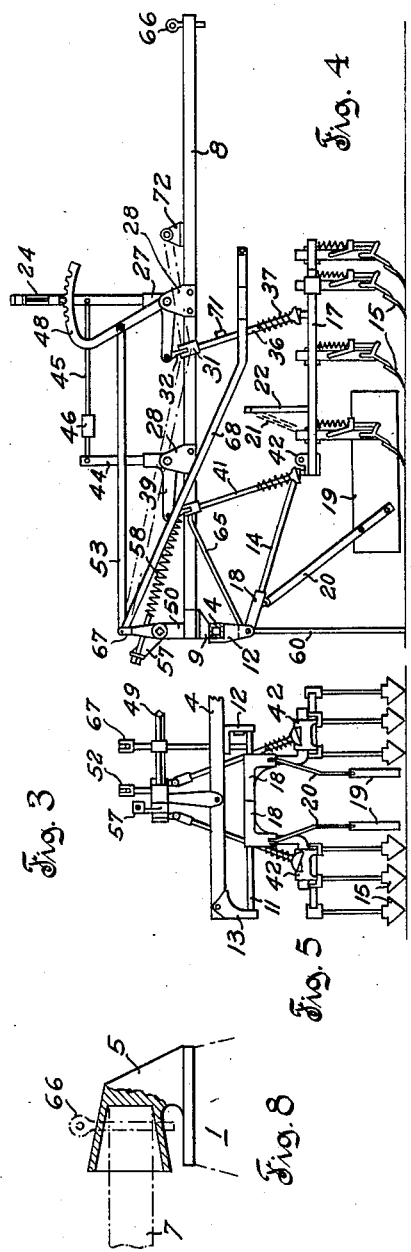
Inventor
W. F. Strehlow
by
Attorney Patented May 2, 1933

1,906,430

UNITED STATES PATENT OFFICE

WALTER F. STREHLOW, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

AGRICULTURAL IMPLEMENT

Application filed November 24, 1930. Serial No. 497,852.

This invention relates to farm implements and is particularly directed to the provision of a soil working attachment for tractors.

It is an object of the invention to provide a simple and efficient attachment for tractors which will permit implements of various types to be associated with the tractor at one or both sides thereof, and which, in particular, may be readily connected to and disconnected from the tractor.

A further object is to provide an attachment of the indicated type, which will be capable of standing on the ground as a self-supporting unit and whose position relative to the ground will remain substantially unchanged while it is being attached to or detached from the tractor.

A further object of the invention is to drive a tractor into and out of an attachment while the latter stands on the ground as a self-supported unit, the attachment having forward and rearward portions for engagement with forward and rearward portions, respectively, of the tractor.

A further object of the invention is to make the tractor bear the whole weight of an attachment which is capable of standing on the ground in a position ready for attachment to the tractor.

A further object of the invention is to utilize implements connected with an attachment frame for at least partly sustaining said frame in substantially the same elevated position above the ground which it occupies when attached to a tractor.

A further object of the invention is to provide an attachment frame connectable with and disconnectable from a tractor by driving the latter into it or out of it, and to arrange implements on said frame in such a manner that they may be moved out of their normal position, where they are in the way of the tractor, into a position where they are not in the way of the tractor but where they are still connected with said frame.

A still further object of the invention is to provide in an implement attachment for tractors improved mechanism for adjusting individual sets of implements.

These and other objects and advantages of the invention will be apparent from the following description. A clear conception of an embodiment of the invention and of the operation of a device constructed in accordance therewith, may be had by referring to the drawings accompanying and forming a part of this specification, in which like reference characters designate the same or similar parts in the several views.

An implement attachment for tractors embodying certain features which are disclosed and broadly claimed herein has been disclosed in a copending application of the present inventor, Serial No. 497,853, filed November 24, 1930.

Referring to the drawings:

Fig. 1 is a perspective view of a cultivator implement adapted to stand on the ground as a self-supporting unit and constructed in such a manner that a tractor can be driven into the implement.

Fig. 2 is a plan view of the implement shown in Fig. 1, a tractor driven into the implement being indicated in dotted lines.

Fig. 3 is a side elevation of the implement shown in Figs. 1 and 2, a tractor ready to be driven into the implement being shown at the right hand side of this figure.

Fig. 4 shows a modified construction of the mechanism for lifting all earth working tools of the implement collectively, the view shown in this figure corresponding to a section on line IV—IV of Fig. 2.

Fig. 5 is a partial front elevation of the implement shown in Fig. 4.

Fig. 6 is a detail view showing a side elevation of a supporting bracket for the implement and part of the front end of the tractor to which the implement is to be attached.

Fig. 7 is a detail view showing a front elevation of the parts shown in Fig. 6.

Fig. 8 is a detail view of a supporting element for the rear end of the implement frame.

Fig. 9 is a detail view of a yielding connection between parts of the implement.

Figs. 10 and 11 are detail views showing the connection between a supporting rod and a forward portion of the implement.

Fig. 12 is a view similar to Fig. 4 but showing an implement in which the earth working tools may be lifted and lowered either by hand or by mechanical power from the tractor.

The numeral 1 indicates, generally, the tractor to which the implement is to be attached and which may be of any suitable design. In the present instance a tractor has been shown embodying certain novel features which are not directly related with the present invention but are more fully disclosed in another application of the same inventor, filed contemporaneously herewith. The tractor is equipped at its forward end with two brackets 2 and 3 adapted to support the main cross bar 4 of the implement frame. The brackets 2 and 3 are formed by steel plates bolted to a forwardly extending portion of the tractor, in the present instance to the upper portion of the front wheel steering truck which is rigidly secured to the main body of the tractor. A horizontal slot extending rearwardly from the forward edge of each plate is provided to accommodate the main cross bar 4 of the implement frame in such a manner that the bar may move freely back and forth but is prevented from moving up and down. The forward edges of each slot are beveled in order to permit the cross bar, which is preferably made of square steel tubing, to slide readily into the slots. Bell-shaped guides 5 and 6 are mounted on a rearward portion of the tractor, in the present instance on top of the gear casings which house final drive gears for the rear traction wheels. The bell-shaped guides have a lateral spacing equal to the spacing of lateral frame bars 7 and 8 of the implement and are adapted to engage the rear ends of these bars when the tractor is driven into the implement.

The forward ends of the lateral frame bars 7 and 8 are rigidly secured to the main cross bar 4 by means of tie brackets 9 bolted or fastened otherwise to the main cross bar and the forward ends of the lateral frame bars. The main cross bar also carries a pair of alined shafts 10 and 11 each of which is mounted in brackets 12 and 13 (Fig. 5) downwardly projecting from the main cross bar. The shafts 10 and 11 serve as front suspension means for drag beams 14 which are associated with the earth working tools. In the present instance cultivator shovels 15 are shown supported by gang bars 16 and 17 which are linked at their forward ends to a transversely extending portion of the respective drag beam 14 by means of sleeve members 42. The drag beams are arranged in pairs adapted to straddle a row of plants at one side of the central longitudinal axis of the tractor, as this is more clearly shown in Fig. 2. Secured to the forward end of each drag beam is a drag link 18 which in turn is pivotally mounted on the corresponding shaft 10 or 11. The drag links 18 are shiftable laterally on the shafts 10 and 11, respectively, for a purpose which will be explained later, and any suitable means, not shown in the drawings, are provided to hold the links in any desired lateral position on the shafts but allowing them to swing freely about the shaft axis. Plant guards 19 are swingably connected to the drag links 18 by means of rearwardly extending suspension rods 20 and are supported at their rear ends by chains 21 depending from suitable brackets 22 secured to the gang bars 16. The plant guards are removable and may be omitted when the implement is used on fields where the plants have grown up to such size that they do not require particular protection.

Mounted on the rearwardly extending lateral frame bars 7 and 8 is a mechanism whereby the working depth of the earth working tools may be adjusted or the tools be lifted from the ground when the implement is attached to the tractor. A hand lever 23 serves to adjust the earth working tools on the left hand side of the implement, a hand lever 24 to adjust the earth working tools on the right hand side of the implement, and a hand lever 25 to adjust all earth working tools of the implement collectively. The hand levers 23 and 24 are secured to and extend upwardly from bell crank levers 26 and 27, respectively, which are journaled on horizontal cross pins mounted in brackets 28 secured to the lateral frame bars. The forwardly extending arms of the bell crank levers are bifurcated and adapted to cooperate with rear connecting rods 29 and 30 extending upwardly from rearward portions of the gang bars 16. Secured to the upper end of each rear connecting rod is a rod end 31 (Fig. 3) carrying a pin on which a short link 32 is pivoted. The upper end of the link 32 is detachably connected to the corresponding arm of the bell crank lever by means of a cross pin inserted into the forward end of said arm. The pin in the rod end and the pin in the corresponding arm of the bell crank lever are disposed at right angles relative to each other, and it will be apparent that the described arrangement provides a universal joint connection between the connecting rods and the arms of the bell crank lever to which they are attached. Another universal joint connection which, however, is of different design, is provided between the lower end of each connecting rod and the gang bar to which it is attached. This joint is of the ball and socket type and more clearly shown in Fig. 9. A hollow ball element 33 is secured to the gang bar 16, and a socket element 34 is fastened to a bar 35 projecting from the lower end of the connecting rod and slidably mounted therein. The lower end of the bar 35 projects into the interior of the ball element through a suitable opening and carries a nut 36 which prevents the bar from being pulled out of the ball element. A compression spring 37 extending between the socket element and the lower end of the connecting rod is placed around the free portion of the bar 35.

The same arrangement which has just been described is provided at the forward ends of the gang bars. Bell crank levers 38 and 39 corresponding to the bell crank levers 26 and 27 are mounted on the lateral frame members 7 and 8 ahead of the bell crank levers 26 and 27 in the same manner as has been described in connection with these levers. Front connecting rods 40 and 41 extending downwardly from the bell crank levers 38 and 39 correspond to the rear connecting rods 29 and 30. Their lower ends are connected to the sleeve members 42 which are journaled on laterally extending portions of the drag beams 14 and support the forward ends of the gang bars 16 and 17. Universal joint connections at the upper and lower ends of the front connecting rods are of the same character as those which have been described in connection with the rear connecting rods. Secured to the upwardly extending arms of the bell crank levers 38 and 39 are levers 43 and 44 which in turn are connected to the hand levers 23 and 24, respectively, by tie rods 45. A turnbuckle 46 or a similar adjustment device is preferably associated with the tie rods in order to secure proper cooperation of the bell crank levers.

Quadrants 47 and 48 cooperating with the hand levers 23 and 24 are provided to hold the hand levers in any adjusted position. The quadrants are pivotally mounted on the same pins on which the hand levers cooperating therewith are journaled and they are interconnected with each other in a particular manner. A cross shaft 49 extending transversely in the front part of the implement is rotatably mounted in bearings 50 which are fastened to the forward ends of the lateral frame bars 7 and 8, respectively. Securely mounted on the cross shaft and extending upwardly therefrom are levers 51 and 52 which are connected to the quadrants 47 and 48, respectively, by links 53. Pivoted to a rearward portion of the link connecting the lever 52 with the quadrant 48 is another link 54 which operatively connects the hand lever 25 with the lever system associated with the quadrants. The hand lever 25 is pivotally mounted on the lower portion of a quadrant 55 which is bolted to the frame bar 8 and serve to hold the hand lever 25 in any adjusted position.

In addition to the levers 51 and 52 the cross shaft 49 carries a pair of levers 56 and 57 which are engaged by balancing springs 58. These springs are tension springs having one of their ends connected to the frame bar 7 or 8, respectively, and the other end connected to the corresponding lever 56 or 57.

It will be seen that the whole implement which has been described so far, forms a unitary structure adapted to stand on the ground. In order to prevent the front end of the implement from tipping over, supporting rods 59 and 60 are attached to the ends of the cross bar 4. The supporting rods are so arranged that they can be pushed inside of the hollow cross bar 4 after the implement has been attached to the tractor. Fig. 10 shows in full lines the position into which the supporting rod may be brought in order to support the implement, and in dash dotted lines the position into which the supporting rod may be brought when it is to be pushed into the cross bar. A hook shaped portion 61 at the upper end of the supporting rod is adapted to engage a bolt 62 which is positioned close to the end of the cross bar and, together with bolts 63, holds the shafts bracket 13 secured to the cross bar. The supporting rod is thus swingably connected to the cross bar and prevented from getting lost. Outer braces 64 and inner braces 65 are provided to hold the frame members 7 and 8 and the main cross bar 4 rigidly secured in their relative position.

In order to permit the tractor to be driven from the position shown in Fig. 3 into the implement the earth working tools are brought in a position relative to the implement frame as shown in Fig. 1, where the drag links 18 have been shifted on the shafts 10 and 11 to their extreme outer positions and the inner drag beams 14 and the earth working tools associated therewith are widely spaced apart so that an unobstructed passage is provided for the closely adjacent front wheels (Fig. 2) of the tractor. The links 18 may be readily shifted on the shafts if the outer rear connecting rods 29 and the outer front connecting rods 40 are detached from the respective arms of the bell crank levers, as this is clearly shown in Fig. 1. The distance from the ground to the main cross bar and the distance from the ground to the slots in the front brackets 2 and 3 on the tractor are as nearly alike as possible, and the rear ends of the lateral frame bars 7 and 8 are alined with the bell-shaped guides on the tractor as this is indicated by the dash dotted horizontal line in Fig. 3. By driving the tractor straight into the implement the brackets and guides on the tractor will be brought into engagement with the cross bar and the lateral bars of the implement, respectively, whereupon the pins 66, which have been removed before, are inserted into the bell-shaped guides so as to retain the lateral bars within these guides, as more clearly shown in Fig. 8. The implement frame is now rigidly connected to the tractor, lateral displacement of the main cross bar being prevented by the downwardly projecting brackets 12 which are closely adjacent to the brackets 2 and 3, as shown in Fig. 7. The length of the lateral frame bars 7 and 8 is preferably such that the rear face of the main cross bar does not touch the rear end of the slot in the brackets 2 and 3 (Fig. 6) when the implement is attached to the tractor, so that the whole push of the tractor is transmitted to the implement by the bell-shaped guides and the lateral frame bars. By pulling the hand lever 25 down all earth working tools are lifted from the ground and the drag links 18 may now be shifted conveniently to the extreme inner position in which they are shown in Fig. 2, whereupon the outer front and rear connecting rods may be connected to their respective bell crank levers. Tie links 71 are preferably provided to brace the rear connecting rods 29 and 30 against each other, and after putting these tie links in place and pushing the front supporting rods 59 and 60 into the main cross bar, the implement is now ready to be driven on the field. The working depth of the earth working tools may be adjusted by means of the hand lever 25, and, moreover, each unit, formed by a pair of drag beams and the earth working tools associated therewith, may be adjusted independently by the hand levers 23 and 24. The yielding connections between the gang bars and the front and rear connecting rods allow the gang bars to move up or down to a certain extent while the implement is driven over the field.

Instead of using the hand operated lever 25 for lifting the earth working tools collectively, a power lift mechanism may be used, and for this purpose the modified construction shown in Figs. 4 and 5 is particularly adapted. The cross shaft 49 is here provided with an additional lever 67 which is secured thereto and projects upwardly therefrom. Pivoted to this lever is a reach rod 68 whose rear end is to be connected to a power driven element of the tractor. In the present instance a rotary disk 69 has been indicated on the tractor, and the rear end of the reach rod is to be connected to a pin 70 laterally projecting from said disk. It will be apparent that, when the disk is rotated through an angle of 180°, the reach rod will be pulled back whereby the shaft 49 is rotated in such direction that the earth working tools operated thereby will be lifted from the ground. By rotating the disk through another angle of 180° the cross shaft 49 will be rotated in the other direction and the earth working tools will be lowered again. The driving mechanism for the disk and the means for effecting intermittent rotation thereof are more fully disclosed in the application which has been mentioned hereinbefore in connection with the tractor. It will be apparent, however, that other means than those disclosed in said application may be used for actuating the reach rod 68.

A bracket 72 is secured to the lateral frame bar 8 and adapted to hold the rear end of the reach rod 68 in a fixed position relative to the frame. Before the tractor is pulled out of the implement the reach rod is disconnected from the disk 69 and secured to the bracket 72, as indicated in dash dotted lines in Fig. 4. This will prevent the shaft 49 from rotating under the influence of the load resting on the connecting rods 29, 30 and 40, 41 after the tractor has been pulled out of the implement.

The hand lever 25 and the reach rod 68 may be installed in the same implement so that the earth working tools can be lifted and lowered either by hand or by mechanical power from the tractor. In order to prevent the hand operating lever 25 from interfering with the operation of the power lift parts 69 and 70 of the tractor, and vice versa, the construction shown in Fig. 12 may be adopted. In this construction a lost motion connection has been provided for between the hand lever 25 and the link 54, a pin on the hand lever engaging a slot 73 in the rear portion of the link. A similar lost motion connection is used to link the reach rod 68 to the disk 69 of the tractor, a pin 70 on the disk engaging a slot 74 in the rear portion of the reach rod. It will be apparent that the lost motion connection of the reach rod will allow the disk 69 to remain stationary while the hand lever 25 is being operated and, on the other hand, the lost motion connection of the link 54 will allow the hand lever 25 to remain stationary while the power lift is being used. Before the tractor is pulled out of the implement it will be necessary to connect the reach rod 68 to a bracket 75 on the frame, as indicated in dash dotted lines in Fig. 12, in order to prevent the cross shaft 49 from rotating when the weight of the implement frame rests on the connecting rods 29, 30 and 40, 41.

It should be understood that it is not intended to limit the invention to the exact details of construction herein shown and described, for various modifications within the scope of the claims may occur to persons skilled in the art.

It is claimed and desired to secure by Letters Patent:

1. The combination with a tractor having a longitudinally extending body supported on front and rear wheels, of means for connecting implements at both sides of the tractor, comprising a cross bar associated with a forwardly extending portion of the tractor, a rearwardly directed lateral bar connected to said cross bar at each side of the tractor, means for operatively connecting said lateral bars to the tractor at points behind a vertical plane through the tractor front wheel axis, and supporting elements laterally and longitudinally spaced apart relative to the longitudinal tractor axis and adapted to hold said cross bar and lateral bars above the ground independently of the tractor in substantially the same position which they occupy when attached to the tractor.

2. The combination with a tractor having a longitudinally extending body supported on front and rear wheels, of means for connecting implements at both sides of the tractor, comprising a cross bar extending transversely to the longitudinal tractor axis, a support associated with a forward portion of the tractor for holding said cross bar in fixed vertical relation to the tractor but allowing it to be displaced parallel to itself in the direction of the longitudinal tractor axis, a rearwardly directed lateral bar connected to said cross bar at each side of the tractor, and means for holding said lateral bars in fixed longitudinal and vertical relation to the tractor.

3. The combination with a tractor having a longitudinally extending body supported on front and rear wheels, of means for connecting implements at both sides of the tractor, comprising a cross bar extending transversely to the longitudinal tractor axis, a support associated with a forward portion of the tractor for holding said cross bar in fixed vertical relation to the tractor but allowing it to be displaced parallel to itself in the direction of the longitudinal tractor axis, a rearwardly directed lateral bar connected to said cross bar at each side of the tractor, a bell-shaped element secured to the tractor body at each side and adapted to hold said lateral bars in a fixed vertical and lateral relation to the tractor, and means to retain the rear ends of said lateral bars within said bell-shaped elements.

4. The combination comprising a machine frame having a front wheeled support and a rear wheeled support, a motor on said machine frame for driving one of said wheeled supports, an implement frame suspended from rear and front portions of said machine frame and having lateral sections transversely spaced apart to provide an open space for occupancy by said machine frame, a plurality of drag beams carried by said implement frame for rocking movement in vertical planes, earth working tools associated with said drag beams, each pair of drag beams and its associated tools forming a vertically adjustable unit, a manually operated lever system mounted on said implement frame for vertically adjusting said units independently of each other, and means connecting said lever system with said motor for vertically adjusting all of said units collectively.

5. An implement attachment for tractors, comprising a frame having front and rear portions adapted to be supported respectively by front and rear portions of a tractor, earth working tools suspended from said frame, and means including said earth working tools for holding said frame in substantially the same position above the ground in which it is to be supported by the tractor.

6. In an implement attachment for tractors, the combination with a frame having front and rear portions adapted to be supported respectively by front and rear portions of a tractor, of means adapted to hold said frame in substantially the same position above the ground in which it is to be supported by the tractor, said means comprising vertically adjustable ground engaging elements and a mechanism associated with said frame to effect vertical adjustment of said ground engaging elements.

7. In an attachment for tractors, the combination with a frame having front and rear portions adapted to be supported respectively by front and rear portions of a tractor, of means adapted to hold said frame in substantially the same position above the ground in which it is to be supported by the tractor, said means comprising vertically adjustable ground engaging elements adapted to be shifted laterally on said frame, and a mechanism associated with said frame to effect vertical adjustment of said ground engaging elements.

8. In an agricultural implement adapted to be pushed by a tractor, a frame member extending transversely to the direction of propulsion, laterally spaced frame members connected to said transverse frame member and projecting rearwardly therefrom, earth working tools associated with said transverse frame member, and means including said earth working tools adapted to hold said laterally spaced frame members in an elevated position above the ground such as to make the distance between said transverse frame member and the ground sufficient to allow the front wheels of a tractor to be driven underneath said transverse frame member.

9. In an agricultural implement adapted to be pushed by a tractor, a frame member extending transversely to the direction of propulsion, drag beams extending rearwardly from said transverse frame member, connecting means associated with said transverse frame member and the forward ends of said drag beams, laterally spaced frame bars connected to said transverse frame member and extending rearwardly therefrom, and means associated with the rear ends of said drag beams and said frame bars and adapted to hold said transverse frame member and said frame bars in an elevated position above the ground.

10. In an agricultural implement adapted to be pushed by a tractor, the combination of two laterally spaced frame bars extending from a forward to a rearward portion of the implement, a cross member connecting the forward ends of said frame bars and extending laterally therefrom at both sides, drag beams extending rearwardly from the laterally extending portions of said cross member, pivotal connecting means associated with said cross member and the forward ends of said drag beams, and means associated with the rear ends of said drag beams and said frame bars and adapted to hold said frame bars in an elevated position above the ground.

11. In an agricultural implement adapted to be pushed by a tractor, the combination of two laterally spaced frame elements extending from a forward to a rearward portion of the implement, a cross member connecting the forward ends of said frame elements and extending laterally therefrom at both sides, drag beams extending rearwardly from the laterally extending portions of said cross member, pivotal connecting means associated with said cross member and the forward ends of said drag beams, and means associated with the rear ends of said drag beams and said laterally spaced frame elements and adapted to hold said frame elements in an elevated position above the ground, said means comprising yielding elements to allow up and down movement of the rear ends of said drag beams relative to said laterally spaced frame elements.

12. In an implement attachment for tractors, an elevated frame member extending transversely to the direction of propulsion, laterally spaced frame bars connected to said transverse frame member and extending rearwardly therefrom, drag beams extending rearwardly and downwardly from said transverse frame member, pivotal connecting means associated with said transverse frame member and the forward ends of said drag beams, earth working tools associated with each of said drag beams, and a mechanism for adjusting the vertical distance between a horizontal plane through said transverse frame member and said earth working tools, said mechanism comprising vertically adjustable elements supported by said frame bars, and connecting members associated with said vertically adjustable elements and said earth working tools and adapted to hold said laterally spaced frame members in an elevated position above the ground.

13. In a cultivator attachment for tractors, a frame member extending transversely to the direction of propulsion, means for detachably securing said frame member to a tractor in vertically fixed relation thereto, laterally spaced frame bars connected to said transverse frame member and extending rearwardly therefrom, means for detachably securing said laterally spaced frame bars to a rearward portion of a tractor, multiple pairs of drag beams extending rearwardly from said transverse frame member and disposed in straddle row relation, pivotal connecting means associated with said transverse frame member and the forward ends of said drag beams, cultivator gang bars associated with each of said drag beams, and a lever system carried by said laterally spaced frame bars for moving said pairs of drag beams individually as well as collectively so as to adjust the vertical distance between said gang bars and a horizontal plane through said transverse frame member.

14. In a cultivator attachment for tractors, a frame member extending transversely to the direction of propulsion, laterally spaced frame bars connected to said transverse frame member and extending rearwardly therefrom, multiple pairs of drag beams extending rearwardly from said transverse frame member and disposed in straddle row relation, pivotal connecting means associated with said transverse frame member and the forward ends of said drag beams, cultivator gang bars associated with each of said drag beams, and a mechanism for adjusting the vertical distance between said gang bars and a vertical plane through said transverse frame member, said mechanism comprising front connecting rods and rear connecting rods associated with said gang bars, bell crank levers pivotally supported by said laterally spaced frame bars for rocking movement in vertical planes and cooperating with said connecting rods in such a manner that an independently controllable unit is formed by each pair of drag beams and its associated gang bars.

15. In a cultivator attachment for tractors, a frame member extending transversely to the direction of propulsion, laterally spaced frame bars connected to said transverse frame member and extending rearwardly therefrom, multiple pairs of drag beams extending rearwardly from said transverse frame member and disposed in straddle row relation, pivotal connecting means associated with said transverse frame member and the forward ends of said drag beams, cultivator gang bars associated with each of said drag beams, and a mechanism for adjusting the vertical distance between said gang bars and a horizontal plane through said transverse frame member, said mechanism comprising front and rear connecting rods associated with said gang bars, bell crank levers pivotally supported by said laterally spaced frame bars for rocking movement in vertical planes and cooperating with said connecting rods in such a manner that an independently controllable unit is formed by each pair of drag beams and its associated gang bars, the bell crank levers of each of these units being operatively connected to a common element and adjustable collectively thereby.

16. In a cultivator attachment for tractors, a frame member extending transversely to the direction of propulsion, laterally spaced frame bars connected to said transverse frame member and extending rearwardly therefrom, multiple pairs of drag beams extending rearwardly from said transverse frame member and disposed in straddle row relation, pivotal connecting means associated with said transverse frame member and the forward ends of said drag beams, cultivator gang bars associated with each of said drag beams, and a mechanism for adjusting the vertical distance between said gang bars and a horizontal plane through said transverse frame member, said mechanism comprising front and rear connecting rods associated with said gang bars, bell crank levers pivotally supported by said laterally spaced frame bars for rocking movement in vertical planes and cooperating with said connecting rods in such a manner that an independently controllable unit is formed by each pair of drag beams and its associated gang bars, the bell crank levers of each of these units being operatively connected to a transversely extending cross shaft rotatably supported by said frame and operable by means of a rearwardly extending element connected to a lever fastened on said cross shaft.

17. A multiple row implement attachment for tractors, comprising a frame, vertically rockable bell crank levers mounted on said frame in laterally spaced pairs, one bell crank lever of each pair being arranged in front of the other, earth working tools associated with each pair of bell crank levers and suspended from said frame so as to be vertically adjustable by rocking the respective pair of bell crank levers, rocking means and locking elements associated therewith, pivotally mounted on said frame for adjusting each pair of bell crank levers individually, and means for rotating all locking elements in unison with their associated rocking means so as to lift or lower all earth working tools collectively.

18. A multiple row implement attachment for tractors, comprising longitudinally extending laterally spaced frame bars, a horizontal cross bar connected to the front ends of said frame bars and extending laterally therefrom at both sides, means to hold said cross bar and said frame bars in relatively fixed position so as to form a rigid frame, a pair of longitudinally spaced bell crank levers mounted on each of said frame bars for rocking movement in a vertical plane, earth working tools associated with each pair of bell crank levers and suspended from the laterally extending portions of said cross bar so as to be vertically adjustable by rocking the respective pair of bell crank levers, rocking means and locking elements pivotally mounted on said frame for adjusting each pair of bell crank levers individually, and means for rotating all locking elements in unison with their associated rocking means so as to lift or lower all earth working tools collectively.

19. A multiple row implement attachment for tractors, comprising a longitudinally extending frame, vertically rockable bell crank levers mounted on said frame in laterally spaced pairs, one bell crank lever of each pair being arranged in front of the other, earth working tools associated with each pair of bell crank levers and suspended from said frame so as to be vertically adjustable by rocking the respective pair of bell crank levers, hand operated rocking means and locking elements associated therewith, pivotally mounted on said frame for adjusting each pair of bell crank levers individually, a cross shaft rotatably mounted on a front portion of said frame and extending transversely to the longitudinal frame axis, rocking levers mounted securely on said cross shaft and connected to said locking elements, and means for rocking said cross shaft so as to lift or lower all earth working tools collectively.

20. A multiple row implement attachment for tractors, comprising a longitudinally extending frame, vertically rockable bell crank levers mounted on said frame in laterally spaced pairs, one bell crank lever of each pair being arranged in front of the other, earth working tools associated with each pair of bell crank levers and suspended from said frame so as to be vertically adjustable by rocking the respective pair of bell crank levers, hand operated rocking means and locking elements associated therewith, pivotally mounted on said frame for adjusting each pair of bell crank levers individually, a cross shaft rotatably mounted on a front portion of said frame and extending transversely to the longitudinal frame axis, rocking levers mounted securely on said cross shaft and connected to said locking elements, hand adjusting means operatively connected to one of said rocking levers, and rocking means for said cross shaft operable by mechanical power supplied by the tractor.

21. A multiple row implement attachment for tractors, comprising a longitudinally extending frame, vertically rockable bell crank levers mounted on said frame in laterally spaced pairs, one bell crank lever of each pair being arranged in front of the other, earth working tools associated with each pair of bell crank levers and suspended from said frame so as to be vertically adjustable by rocking the respective pair of bell crank levers, hand operated rocking means and locking elements associated therewith, pivotally mounted on said frame for adjusting each pair of bell crank levers individually, a cross shaft rotatably mounted on a front portion of said frame and extending transversely to the longitudinal frame axis, rocking levers mounted securely on said cross shaft and connected to said locking elements, hand adjusting means operatively connected to one of said rocking levers, and power actuated rocking means for said cross shaft, operable by mechanical power supplied by the tractor, said hand adjusting means and power actuated rocking means being operable independently of each other.

22. An implement attachment for tractors comprising a frame structure having transversely spaced frame sections arranged to form an intermediate space for occupancy by a tractor, tool supporting means connected to said frame sections, a mechanism mounted on each of said frame sections for vertically adjusting said tool supporting means connected thereto, and means including a transverse shaft common to said mechanisms and extending between said frame sections, for vertically adjusting all of said tool supporting means collectively.

23. An implement attachment for tractors comprising a frame structure having transversely spaced frame sections interconnected at their forward ends and arranged to form an intermediate space for occupancy by a tractor, tool supporting means connected to said frame sections adjacent to the forward ends thereof and extending rearwardly therefrom, a mechanism mounted on each of said frame sections for vertically adjusting said tool supporting means connected thereto, and means including a transverse shaft common to said mechanisms and extending between forward portions of said frame sections, for vertically adjusting all of said tool supporting means collectively.

24. An implement attachment for tractors comprising a frame structure having transversely spaced frame sections interconnected at their forward ends and arranged to form an intermediate space for occupancy by a tractor, vertically and horizontally adjustable tool supporting means connected to said frame sections, a mechanism mounted on each of said frame sections for vertically adjusting said tool supporting means connected thereto, and means, including a transverse shaft common to said mechanisms and extending between forward portions of said frame sections, for vertically adjusting all of said tool supporting means collectively.

25. The combination comprising a machine frame having a front wheeled support and a rear wheeled support, an implement frame suspended from rear and front portions of said machine frame and extending laterally therefrom, vertically adjustable earth engaging tools carried by said implement frame, and means including said earth engaging tools, for holding said implement frame above the ground independently of the tractor in substantially the same position in which it is supported by said tractor.

26. An implement attachment for tractors comprising a cross member extending transversely to the direction of propulsion, means for attaching said cross member to a tractor, tool supporting means associated with said cross member, a mechanism for vertically adjusting said tool supporting means, and means including tools carried by said tool supporting means for holding said cross member in an elevated position above the ground, independently of the tractor, for ready attachment thereto.

27. An implement attachment for tractors comprising a cross member extending transversely to the direction of propulsion, a frame element extending rearwardly from said cross member, means for attaching said cross member and a rearward portion of said frame element to a tractor, and supporting elements laterally and longitudinally spaced apart relative to the direction of propulsion and adapted to hold said cross member and the rear portion of said frame element in an elevated position above the ground, independently of the tractor, for ready attachment thereto.

28. An implement attachment for tractors comprising a cross member extending transversely to the direction of propulsion, a frame element extending rearwardly from said cross member, means for attaching the cross member and a rearward portion of said frame element to a tractor, tool supporting means associated with said cross member, a mechanism for vertically adjusting said tool supporting means, and means including tools carried by said tool supporting means for holding said cross member and said frame element in an elevated position above the ground, independently of the tractor, for ready attachment thereto.

29. An implement attachment for tractors comprising a cross member extending transversely to the direction of propulsion, a frame element extending rearwardly from said cross member, means for attaching said cross member and a rearward portion of said frame element to a tractor, tool supporting means connected to said cross member and extending downwardly and rearwardly therefrom, connecting means between a rearward portion of said tool supporting means and said frame element and means including said connecting means for holding said cross member and said frame element in an elevated position above the ground, independently of the tractor, for ready attachment thereto.

In testimony whereof, the signature of the inventor is affixed hereto.

WALTER F. STREHLOW.